(12) United States Patent
Santi et al.

(10) Patent No.: US 10,583,633 B2
(45) Date of Patent: Mar. 10, 2020

(54) GLASS COVER

(71) Applicant: ISOCLIMA S.P.A., Este (IT)

(72) Inventors: Daniele Santi, Este (IT); Roberto Rampazzo, Este (IT)

(73) Assignee: ISOCLIMA S.P.A., Este (IT)

( * ) Notice: Subject to any disclaimer, the term of this patent is extended or adjusted under 35 U.S.C. 154(b) by 292 days.

(21) Appl. No.: 15/509,753

(22) PCT Filed: Sep. 11, 2015

(86) PCT No.: PCT/EP2015/001830
§ 371 (c)(1),
(2) Date: Mar. 8, 2017

(87) PCT Pub. No.: WO2016/041628
PCT Pub. Date: Mar. 24, 2016

(65) Prior Publication Data
US 2017/0259531 A1 Sep. 14, 2017

(30) Foreign Application Priority Data
Sep. 15, 2014 (EP) .................................... 14425114

(51) Int. Cl.
B32B 3/24 (2006.01)
B32B 17/10 (2006.01)
B60J 1/20 (2006.01)
B32B 7/12 (2006.01)
B62D 25/06 (2006.01)
B32B 3/26 (2006.01)

(52) U.S. Cl.
CPC .......... B32B 17/10018 (2013.01); B32B 7/12 (2013.01); B32B 17/1077 (2013.01); B32B 17/10293 (2013.01); B32B 17/10302 (2013.01); B32B 17/10752 (2013.01); B32B 17/10761 (2013.01); B32B 17/10779 (2013.01); B60J 1/2094 (2013.01); B62D 25/06 (2013.01); B32B 3/266 (2013.01); B32B 2307/00 (2013.01); B32B 2329/06 (2013.01); B32B 2367/00 (2013.01); B32B 2369/00 (2013.01); B32B 2375/00 (2013.01); B32B 2605/006 (2013.01); Y10T 428/24339 (2015.01)

(58) Field of Classification Search
CPC ..................... Y10T 428/24339; B32B 3/266
See application file for complete search history.

(56) References Cited

U.S. PATENT DOCUMENTS

| 6,034,320 | A | 3/2000 | Malcherczyk et al. |
| 2004/0183342 | A1 | 9/2004 | Paetz et al. |
| 2006/0232093 | A1 | 10/2006 | Boehm et al. |
| 2008/0210361 | A1 | 9/2008 | Bohm et al. |
| 2009/0019798 | A1 | 1/2009 | Teschner et al. |
| 2013/0283727 | A1 | 10/2013 | Lorenz et al. |

OTHER PUBLICATIONS

International Search Report dated Jan. 14, 2016 in International Application No. PCT/EP2015/001830.

Primary Examiner — William P Watkins, III
(74) Attorney, Agent, or Firm — Hauptman Ham, LLP

(57) ABSTRACT

The present disclosure relates to a glass cover, particularly a glass cover used in a vehicle roof, which includes a glass pane, anti-shatter layer means arranged on an underside of the glass pane, and an encapsulation formed on an edge region of the glass pane wherein the anti-shatter layer means covers the whole underside of the glass pane and extends into the encapsulation.

11 Claims, 2 Drawing Sheets

GLASS COVER

RELATED APPLICATIONS

The present application is a National Phase of International Application Number PCT/EP2015/001830 filed Sep. 11, 2015, and claims priority to European Application Number 14425114.7, filed Sep. 15, 2014.

The present invention refers to a glass cover, particularly to a glass cover for a vehicle roof.

Glass covers or windows used in roofs of vehicles are often subjected to high forces generated, for instance, by strong air flow passing the vehicle during higher speed, by adverse effects resulting from an accident or by objects like stones etc. impinging on the glass roof. A breakage of the glass roof pane then could result and the occupants in the vehicle have to be protected against splinters or glass parts from the glass cover.

It is an object of the present invention to provide a glass cover that ensures protection of the vehicle occupants in case of breakage of its glass pane.

This object is solved by the glass cover of the invention according to claim 1. Accordingly, the glass cover of the invention, which may be a glass cover used in a vehicle roof, comprises a glass pane, anti-shatter layer means arranged on an underside of the glass pane, and an encapsulation formed on an edge region of the glass pane wherein the anti-shatter layer means covers the whole underside of the glass pane and extends into the encapsulation. The glass cover or roof window of the invention ensures the protection of the occupants in a vehicle or car using this glass cover since the anti-shatter layer covers the whole underside of the glass pane to stop splinters or glass parts resulting in case of a breakage of the glass pane.

The anti-shatter layer means or combined anti-shatter film or foil may comprise an anti-shatter scratch-resistant foil or layer and an adhesive anti-shatter foil or layer laminated on the underside of the glass pane wherein the anti-shatter scratch-resistant foil is arranged on an underside of the adhesive anti-shatter foil. Accordingly, the anti-shatter scratch-resistant foil does not only improve the anti-shatter resistance of the anti-shatter layer means, but it ensures also a protection of the adhesive anti-shatter foil against scratches that could otherwise affect the protective anti-shatter characteristic of the adhesive foil.

Preferably, the anti-shatter scratch-resistant foil is a polyethylene terephthalate (PET) foil or polycarbonate (PC) foil and the adhesive anti-shatter foil is a polyvinyl butyral (PVB) or polyurethane (PU) foil or layer to ensure the anti-shatter resistance of the combined anti-shatter film.

The encapsulation may be made of or comprises plastic foam like, for instance, PU foam or ethylene propylene diene monomer (EPDM) foam or rubber, thermoplastic elastomer (TPE) or polyvinyl chloride (PVC) foam which allows to seal and protect the edge of the glass cover and to mount additional mechanical parts like holding parts on the glass pane.

Preferably, the adhesive anti-shatter foil of the combined anti-shatter film and the encapsulation consist of the same plastic material to be able to realize a strong cross linking or chemical bonding of the adhesive anti-shatter foil and the encapsulation where the adhesive anti-shatter foil or layer and the encapsulation are in mutual touch or contact. For instance, the adhesive anti-shatter foil can be made of thermoplastic PU and the encapsulation can be made of PU foam to ensure strong mutual bounding.

The anti-shatter layer means may have recesses or holes in an edge region of the glass pane of the cover within the encapsulation which are formed in series along at least a part of the edge region of the glass pane wherein these recesses or holes are filled up by the encapsulation to increase the surface area of contact between the adhesive anti-shatter foil and the encapsulation for increasing the contacting force. A detaching of the anti-shatter scratch-resistant foil is avoided by the embodiments of the invention using these holes. The recesses or holes can perforate or go through the anti-shatter scratch-resistant foil of the anti-shatter layer means. The recesses or holes can also be yet even deeper within the adhesive and anti-shatter foil of the anti-shatter layer means to increase the contact surface between encapsulation and adhesive anti-shatter foil yet further. The recesses or holes may be perforations or through-holes in the anti-shatter layer means.

Preferably, the anti-shatter layer means consists of a single adhesive anti-shatter layer made of a material that is not PET.

Further advantageous and preferred embodiments are mentioned in the dependent claims. Additional objects, advantages, and features of the invention could be derived from the following detailed description and drawings of exemplified and preferred embodiments of the invention, in which:

Figure 1:
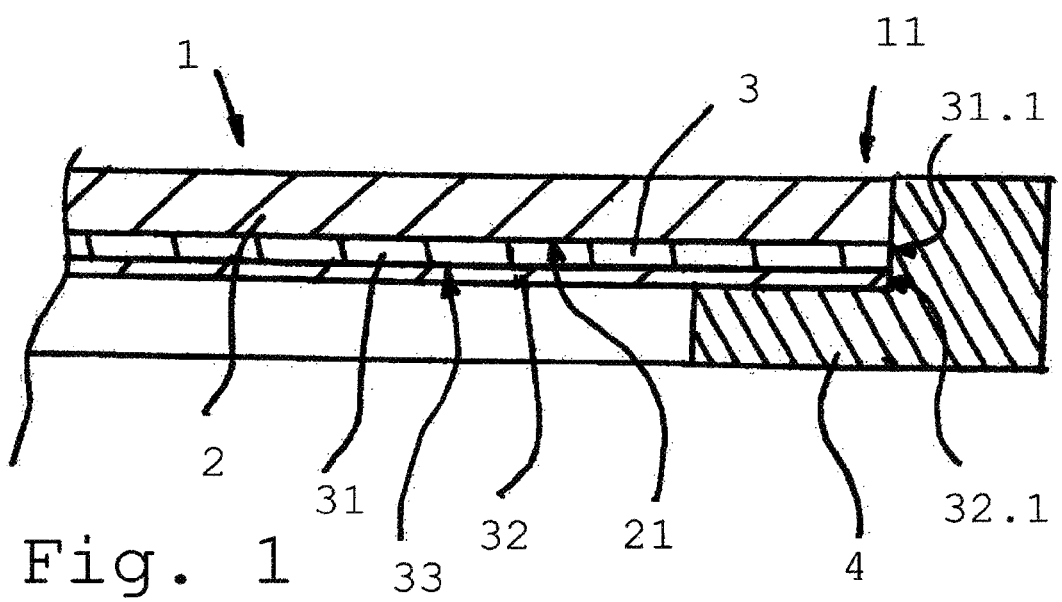
FIG. 1 is a schematic sectional partial view of an edge region of a first embodiment of the glass cover of the invention.

FIG. 1 shows a schematic sectional partial view of an edge region 11 of a first embodiment of a glass cover 1 of the invention. The laminated glass cover 1 or window, which is used in a vehicle roof, comprises a glass pane 2 made, for instance, of an at least partly transparent safety glass, at least partly transparent anti-shatter layer means 3 arranged on an underside 21 surface of the glass pane 2, and a frame like encapsulation 4 formed on the edge region 11 of the glass cover 1 wherein the anti-shatter layer means 3 or combined anti-shatter film covers the whole underside 21 of the glass pane 2 and extends into the encapsulation 4.

The anti-shatter layer means 3 comprises an anti-shatter scratch-resistant foil 32 or layer and an adhesive anti-shatter foil 31 or layer laminated on the underside 21 of the glass pane 2 wherein the anti-shatter scratch-resistant foil 32 is arranged on an underside 33 of the adhesive anti-shatter foil 31. The underside 33 of the anti-shatter scratch-resistant foil 32 is exposed to the interior of the vehicle. Preferably, the anti-shatter scratch-resistant foil 32 is also tear-resistant and it is made of polyethylene terephthalate (PET). The adhesive anti-shatter foil 31 is made of polyurethane (PU). The encapsulation (4) is made of plastic foam, preferably PU foam. The edge faces of the adhesive anti-shatter foil 31, of the anti-shatter scratch-resistant foil 32, and of the glass pane 2 are flush to each other. The etch face 31.1 of the PU adhesive anti-shatter foil 31 is in contact with the PU foam encapsulation 4 and shows high bonding forces due to the same material used and, therefore, the edge face 32.1 or edge of the anti-shatter scratch-resistant foil 32 remains fixed on the adhesive anti-shatter foil 31.

Figure 3:
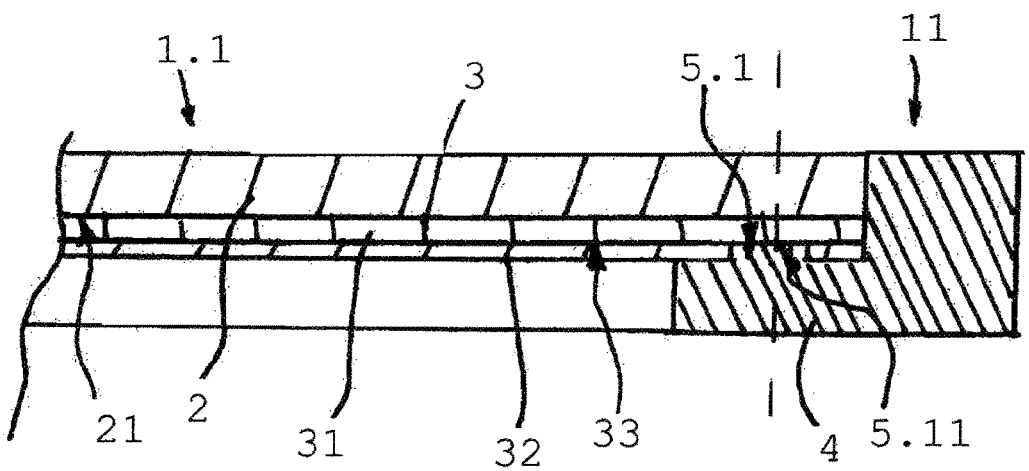
FIG. 3 is a schematic sectional partial view of an edge region of a third embodiment of the glass cover of the invention.

FIG. 3 shows a schematic sectional partial view of an edge region 11 of a third embodiment of a glass cover 1.1 of the invention. The laminated glass cover 1.1 comprises again a glass pane 2 made, for instance, of an at least partly transparent safety glass, at least partly transparent anti-shatter layer means 3 arranged on an underside 21 surface of the glass pane 2, and a frame like encapsulation 4 formed on the edge region 11 of the glass cover 1.1 wherein the anti-shatter layer means 3 covers the whole underside 21 of the glass pane 2 with the exception of a plurality of recesses or holes 5.1 in the anti-shatter layer means 3 and extends into the encapsulation 4.

The anti-shatter layer means 3 comprises an anti-shatter scratch-resistant foil 32. The underside 33 of the anti-shatter scratch-resistant foil 32 is exposed at least partly to the interior of the vehicle. The anti-shatter scratch-resistant foil 32 is made of polyethylene terephthalate (PET). The adhesive anti-shatter foil 31 is made of polyurethane (PU).

FIG. 3 shows one hole 5.1 of the plurality of holes which are provided within the anti-shatter scratch-resistant PET foil 32 within the PU foam encapsulation 4 in the edge region 11 of the glass cover 1.1. The holes 5.1 go through the whole anti-shatter scratch-resistant PU foil 32 and they end at the underside 33 surface of the adhesive anti-shatter PU foil 31 which forms a bottom 5.11 of the holes 5.1. Preferably, the holes 5.1 are formed in series along a least a part of the edge region 11 of the glass pane 2 within the PU foam encapsulation 4 wherein these recesses or holes 5.1 are filled by the PU foam of the encapsulation 4. Due to the holes 5.1 reaching the underside 33 surface of the adhesive anti-shatter PU foil 31, the contacting surface between the PU foil 31 and the PU foam encapsulation 4 is increased as compared to the first embodiment of FIG. 1.

Figure 4:
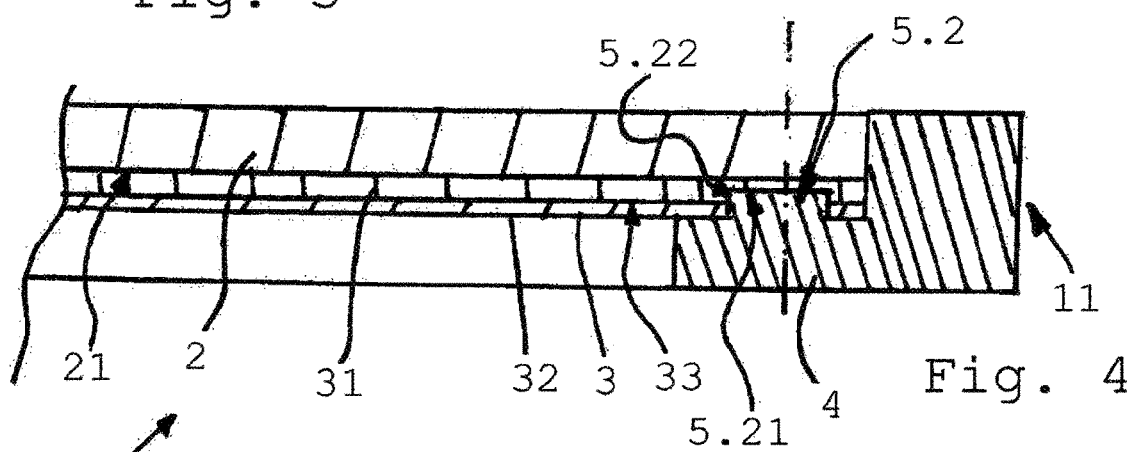
FIG. 4 is a schematic sectional partial view of an edge region of a fourth embodiment of the glass cover of the invention.

FIG. 4 shows a schematic sectional partial view of an edge region 11 of a fourth embodiment of a glass cover 1.2 of the invention. The transparent laminated glass cover 1.2 comprises again a glass pane 2 made, for instance, of an at least partly transparent safety glass, at least partly transparent anti-shatter layer means 3 arranged on an underside 21 surface of the glass pane 2, and a frame like encapsulation 4 formed on the edge region 11 of the glass cover 1.2 wherein the anti-shatter layer means 3 covers the whole underside 21 of the glass pane 2 with the exception of a plurality of recesses or holes 5.2 in the anti-shatter layer means 3 and extends into the encapsulation 4.

The anti-shatter layer means 3 comprises an anti-shatter scratch-resistant foil 32. The underside 33 of the anti-shatter scratch-resistant foil 32 is exposed at least partly to the interior of the vehicle. The anti-shatter scratch-resistant foil 32 is made of polyethylene terephthalate (PET). The adhesive anti-shatter foil 31 is made of polyurethane (PU).

FIG. 4 shows one hole 5.2 of the plurality of holes which are provided within the anti-shatter scratch-resistant PET foil 32 within the PU foam encapsulation 4 in the edge region 11 of the glass cover 1.2. The holes 5.2 go through the whole anti-shatter scratch-resistant PU foil 32 and they end within the adhesive anti-shatter foil 31 which means that a bottom 5.21 of the holes 5.2 is within the adhesive anti-shatter foil 31. Preferably, the holes 5.2 are formed in series along a least a part of the edge region 11 of the glass pane 2 within the PU foam encapsulation 4 wherein these recesses or holes 5.2 are filled by the PU foam of the encapsulation 4. Due to the bottoms 5.21 of the holes 5.2 within the adhesive anti-shatter PU foil 31, the contacting surface between the PU foil 31 and the PU foam encapsulation 4 is increased further as compared to the third embodiment of FIG. 3 since side walls 5.22 defining the holes 5.2 within the anti-shatter adhesive foil 31 are added to the contacting surface between the adhesive anti-shatter PU foil 31 and the PU foam encapsulation 4 as compared to the third embodiment of FIG. 3.

Figure 5:
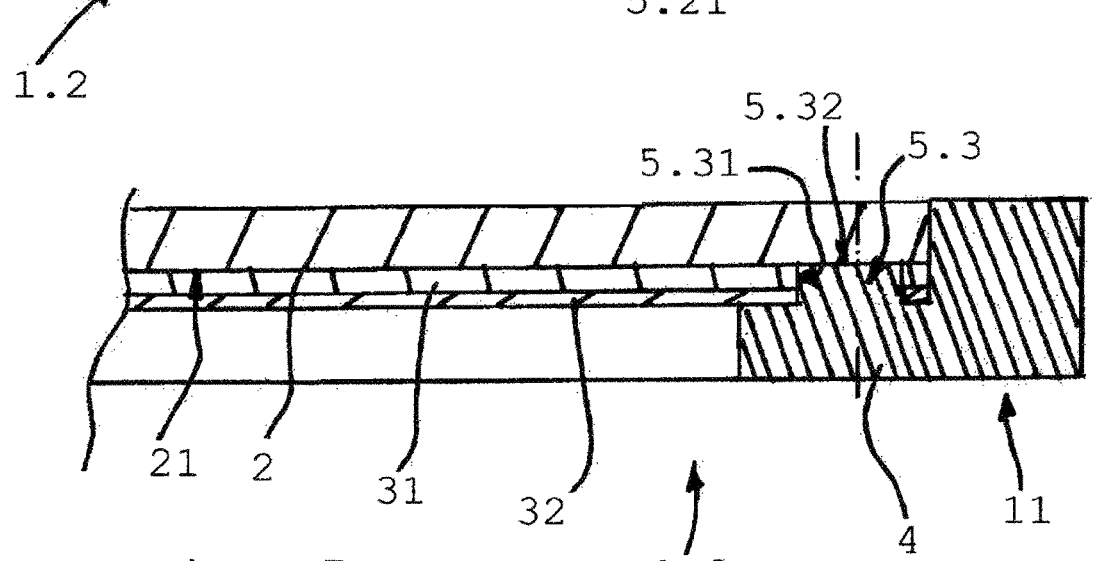
FIG. 5 is a schematic sectional partial view of an edge region of a fifth embodiment of the glass cover of the invention.

FIG. 5 shows a schematic sectional partial view of an edge region 11 of a fifth embodiment of a glass cover 1.3 of the invention. The transparent laminated glass cover 1.3 comprises again a glass pane 2 made, for instance, of an at least partly transparent safety glass, at least partly transparent anti-shatter layer means 3 arranged on an underside 21 surface of the glass pane 2, and a frame like encapsulation 4 formed on the edge region 11 of the glass cover 1.2 wherein the anti-shatter layer means 3 covers the whole underside 21 of the glass pane 2 with the exception of a plurality of recesses or holes 5.3 in the anti-shatter layer means 3 and extends into the encapsulation 4.

The anti-shatter layer means 3 comprises an anti-shatter scratch-resistant foil 32. The underside of the anti-shatter scratch-resistant foil 32 is exposed at least partly to the interior of the vehicle. The anti-shatter scratch-resistant foil 32 is made of polyethylene terephthalate (PET). The adhesive anti-shatter foil 31 is made of polyurethane (PU).

FIG. 5 shows one hole 5.3 of the plurality of holes which are provided within the anti-shatter scratch-resistant PET foil 32 within the PU foam encapsulation 4 in the edge region 11 of the glass cover 1.3. The holes 5.3 go through the whole anti-shatter scratch-resistant PU foil 32 and through the whole adhesive anti-shatter foil 31 and they end at the underside 21 surface of the glass pane 2 which forms a bottom 5.32 of the holes 5.3. Preferably, the holes 5.3 are formed in series along a least a part of the edge region 11 of the glass pane 2 within the PU foam encapsulation 4 wherein these holes 5.3 are filled by the PU foam of the encapsulation 4. The contacting surface between the PU foil 31 and the PU foam encapsulation 4 is increased as compared to the first embodiment of FIG. 1 since side walls 5.31 defining the holes 5.3 within the anti-shatter adhesive foil 31 are added to the contacting surface between the adhesive anti-shatter PU foil 31 and the PU foam encapsulation 4 to increase the contacting forces.

Figure 2:
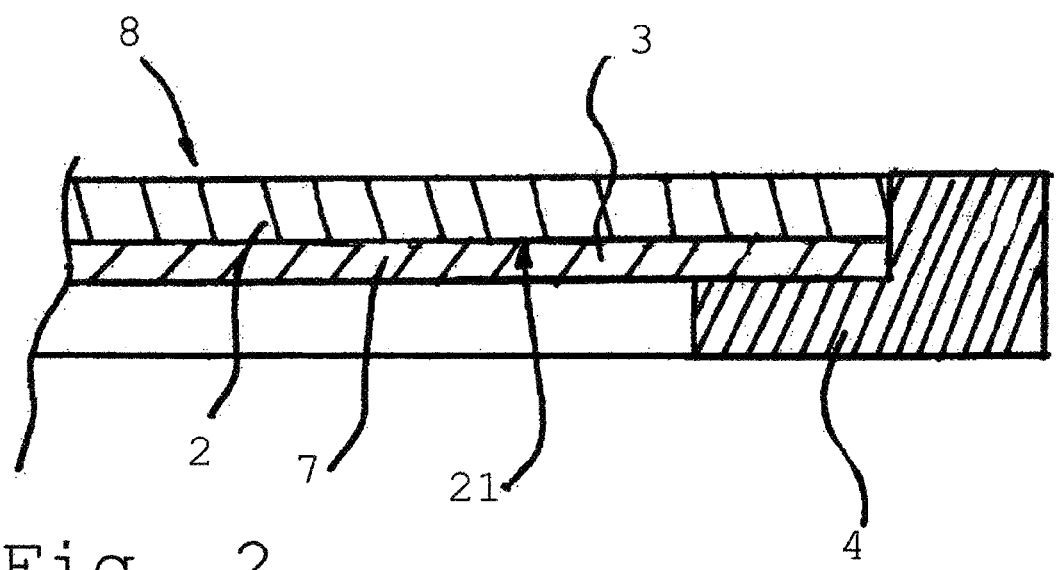
FIG. 2 is a schematic sectional partial view of an edge region of a second embodiment of the glass cover of the invention.

FIG. 2 shows a schematic sectional partial view of an edge region 11 of a second embodiment of a glass cover 8 of the invention. The laminated glass cover 8 or window, which is used in a vehicle roof, comprises a glass pane 2 made, for instance, of an at least partly transparent safety glass, at least partly transparent anti-shatter layer means 3 arranged on an underside 21 surface of the glass pane 2, and a frame like encapsulation 4 formed on the edge region 11 of the glass cover 1 wherein the anti-shatter layer means 3 covers the whole underside 21 of the glass pane 2 and extends into the encapsulation 4. The anti-shatter layer means 3 comprises a single adhesive anti-shatter anti-scratch layer 7 made of a material that is not PET, but, for instance, the layer 7 consists of or comprises an adhesive anti-scratch self-filling anti-shatter PU foil or an adhesive anti-scratch self-filling anti-shatter thermoplastic elastomer (TPE) or foil.

The invention claimed is:
1. Glass cover in a vehicle roof, which comprises comprising:
   a glass pane;
   an anti-shatter layer structure arranged on an underside of the glass pane; and an encapsulation formed on an edge region of the glass cover,
wherein the anti-shatter layer structure covers the whole underside of the glass pane and extends into the encapsulation, the anti-shatter layer structure comprises
an anti-shatter scratch resistant foil, and
an adhesive anti-shatter foil laminated on the underside of the glass pane,
wherein the anti-shatter scratch-resistant foil is arranged on an underside of the adhesive anti-shatter foil such that
an edge face of the adhesive anti-shatter foil,
an edge face of the anti-shatter scratch-resistant foil, and
an edge face of the glass pane,
are flush to each other in the edge region of the glass cover, and
wherein the edge face of the adhesive anti-shatter foil is in contact with the encapsulation.

2. Glass cover according to claim 1, wherein the anti-shatter scratch-resistant foil is made of polyethylene terephthalate (PET) or polycarbonate (PC) and the adhesive anti-shatter foil is made of polyvinyl butyral (PVB) or polyurethane (PU).

3. Glass cover according to claim 1, wherein the encapsulation is made of plastic foam.

4. Glass cover according to claim 1, wherein the adhesive anti-shatter foil and the encapsulation comprise the same plastic material.

5. Glass cover according to claim 4, wherein the adhesive anti-shatter foil is made of thermoplastic PU and the encapsulation is made of PU foam.

6. Glass cover according to claim 1, wherein the anti-shatter layer structure has recesses or holes in an edge region of the glass pane within the encapsulation which are formed in series along at least a part of the edge region of the glass pane, wherein these recesses or holes are filled by the material of the encapsulation.

7. Glass cover according to claim 6, wherein the recesses or holes extend through an entire thickness of the anti-shatter scratch-resistant foil of the anti-shatter layer structure.

8. Glass cover according to claim 7, wherein the recesses and holes are within the adhesive anti-shatter foil of the anti-shatter layer structure.

9. Glass cover according to claim 8, wherein the recesses or holes extend through an entire thickness of the anti-shatter layer structure.

10. Glass cover according to claim 1, wherein the anti-shatter layer structure comprises a single adhesive anti-shatter layer made of a material that is not PET, but the single adhesive anti-shatter layer comprises an adhesive anti-scratch self-filling anti-shatter PU foil or an adhesive anti-scratch self-filling anti-shatter thermoplastic elastomer (TPE).

11. Glass cover according to claim 1, wherein
the anti-shatter scratch-resistant foil is tear-resistant and is made of polyethylene terephthalate (PET),
the adhesive anti-shatter foil is made of polyurethane (PU),
the encapsulation is made of PU foam, and
the edge face of the adhesive anti-shatter foil made of PU is in contact with the encapsulation made of PU foam such that an edge of the anti-shatter scratch-resistant foil remains fixed on the adhesive anti-shatter foil.

* * * * *